(12) United States Patent  
Shen et al.

(10) Patent No.: US 8,737,220 B2  
(45) Date of Patent: May 27, 2014

(54) SYSTEMS FOR PROVIDING FEEDBACK TO SENDING ENTITIES

(75) Inventors: Qi Shen, New York, NY (US); Henning Schulzrinne, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 117 days.

(21) Appl. No.: 12/565,096

(22) Filed: Sep. 23, 2009

(65) Prior Publication Data

US 2010/0074132 A1 Mar. 25, 2010

Related U.S. Application Data

(60) Provisional application No. 61/099,560, filed on Sep. 23, 2008.

(51) Int. Cl.  
*H04J 1/16* (2006.01)

(52) U.S. Cl.  
USPC .......................... 370/235; 370/231; 709/329

(58) Field of Classification Search  
CPC ......... H04L 47/10; H04L 47/35; H04L 47/32; H04L 47/27; H04L 12/5602; H04L 2012/34; H04L 2012/5632; H04L 2012/5635; H04L 2012/5636; H04L 43/0876; H04L 43/0882; H04L 43/0894  
USPC .......... 370/235, 251, 252, 351, 231; 709/227, 709/229, 232  
See application file for complete search history.

(56) References Cited

U.S. PATENT DOCUMENTS

| | | | |
|---|---|---|---|
| 4,974,256 A | 11/1990 | Cyr et al. | |
| 6,442,139 B1 | 8/2002 | Hosein | |
| 7,577,131 B2 * | 8/2009 | Joseph et al. | 370/351 |
| 7,639,676 B2 * | 12/2009 | Nishida et al. | 370/363 |
| 2005/0105464 A1 | 5/2005 | Acharya et al. | |
| 2006/0109839 A1 * | 5/2006 | Hino et al. | 370/352 |
| 2008/0031258 A1 | 2/2008 | Acharya et al. | |
| 2008/0288648 A1 * | 11/2008 | Schneider | 709/229 |
| 2009/0063697 A1 * | 3/2009 | Fukao | 709/232 |
| 2009/0122704 A1 * | 5/2009 | DeVal et al. | 370/235 |
| 2011/0173436 A1 * | 7/2011 | VanHeyningen et al. | 713/150 |

OTHER PUBLICATIONS

Erich Nahum and John Tracey and Charles Wright: Evaluating SIP server performance. In ACM SIGMETRICS Performance Evaluation Review. vol. 35 (Jun. 2007) 349-350.

J. Rosenberg: Requirements for Management of Overload in the Session Initiation Protocol. Internet draft (Jan. 2008) work in progress.

Kasera, S., Pinheiro, J., Loader, C., Karaul, M., Hari, A., LaPorta, T.: Fast and robust signaling overload control. Network Protocols, 2001. Ninth International Conference on (Nov. 11-14, 2001) 323-331.

M. Ohta: Overload Protection in a SIP Signaling Network. In: International Conference on Interenet Surveillance and Protection (ICISP'06)). (2006).

Noel, E., Johnson, C.: Initial simulation results that analyze SIP based VoIP networks under overload. In: ITC. (2007) 54-64.

Rosenberg, J., Schulzrinne, H., Camarillo, G., Johnston, A., Peterson, J. Sparks, R., Handley, M. Schooler, E.: SIP Session Initiation Protocol. FRC 3261 (Proposed Standard) (Jun. 2002) Updated by RFCs 3265, 3853, 4320.

U.S. Appl. No. 61/099,560, filed Sep. 23, 2008.

V. Hilt, I. Widjaja, D. Malas, H. Schulzrinne: Session Initiation Protocol (SIP) Overload Control. Internet draft (Feb. 2008) work in progress.

Whitehead, M.: GOCAP—one standardised overload control for next generation networks. BT Technology Jounral 23 (1)(2005) 147-153.

* cited by examiner

*Primary Examiner* — Awet Haile  
(74) *Attorney, Agent, or Firm* — Byrne Poh LLP

(57) ABSTRACT

Systems for providing feedback to sending entities are provided. In some embodiments, systems for providing feedback to at least one sending entity that sends requests are provided, the systems comprising: a receiving entity comprising at least one processor that: determines a number of active sources associated with each of the at least one sending entity; determines a number of sessions that each of the at least one sending entity is able to accept based on the number of active sources determined; and provides an indication of the number of sessions to each corresponding one of the at least one sending entity.

15 Claims, 11 Drawing Sheets

SYSTEMS FOR PROVIDING FEEDBACK TO SENDING ENTITIES

CROSS REFERENCE TO RELATED APPLICATION

This application claims the benefit of U.S. Provisional Patent Application No. 61/099,560, filed Sep. 23, 2008, which is hereby incorporated by reference herein in its entirety.

TECHNICAL FIELD

The disclosed subject matter relates to systems for providing feedback to sending entities.

BACKGROUND

Modern communication networks, such as computer networks, telephone networks, television networks, etc., are frequently subject to situations in which a component is overloaded and consequently unable to perform the function that component is requested to provide. For example, in networks employing the Session Initiation Protocol (SIP), such as networks providing Voice over Internet Protocol (VoIP), servers can be overloaded when used to established call sessions between user agents (such as mobile telephones) in high call-demand situations, such as during wide-spread emergencies, contests, newly on-sale situations (such as when concert tickets go on-sale), call-in television programs, etc. As a result, with increasing overload, these servers can realize a rapid decrease in their ability to establish any call sessions, not just those above an overload threshold.

While attempts to address such overload situations have made, these attempts have not adequately provided a mechanism for responding to such overload situations.

SUMMARY

Systems for providing feedback to sending entities are provided. In some embodiments, systems for providing feedback to at least one sending entity that sends requests are provided, the systems comprising: a receiving entity comprising at least one processor that: determines a number of active sources associated with each of the at least one sending entity; determines a number of sessions that each of the at least one sending entity is able to accept based on the number of active sources determined; and provides an indication of the number of sessions to each corresponding one of the at least one sending entity.

In some embodiments, systems for providing feedback to at least one sending entity that sends requests are provided, the systems comprising: a receiving entity comprising at least one processor that decreases a number of sessions a sending entity is able to accept in response to a new session request being received by the receiving entity, increases that number of sessions that the sending entity is able to accept in response to a session request being processed by the receiving entity; and provides an indication of the number of sessions to the sending entity.

In some embodiments, systems for providing feedback to at least one sending entity that sends requests are provided, the systems comprising: a receiving entity comprising at least one processor that: assigns a freed processing slot to an active sender in response to determining that a request has been processed and that a number of requests to be processed is less than a first limit.

In some embodiments, systems for providing feedback to at least one sending entity that sends requests are provided, the systems comprising: a receiving entity comprising at least one processor that: determines a session service rate for the receiving entity; determines a number of sessions to be serviced by the receiving entity; determines a target rate limit for each of the at least one sending entity based on the session service rate and the number of sessions to be services; and provides an indication of the target rate limit to each corresponding one of the at least one sending entity.

Methods for providing feedback to sending entities are also provided. In some embodiments, methods for providing feedback to at least one sending entity that sends requests are provided, the methods comprising: determining a number of active sources associated with each of the at least one sending entity; determining a number of sessions that each of the at least one sending entity is able to accept based on the number of active sources determined; and providing an indication of the number of sessions to each corresponding one of the at least one sending entity.

DETAILED DESCRIPTION

In accordance with various embodiments, mechanisms for providing feedback to sending entities are provided. These mechanisms can be used in a variety of applications, such as to control a load received by a receiving server from one or more sending servers in some embodiments. As a more particular example, such mechanisms can be used in a Session Initiation Protocol (SIP) environment to control the number of sessions accepted by a receiving entity server from user agents proxied by one or more sending entity servers, in some embodiments.

Figure 1:
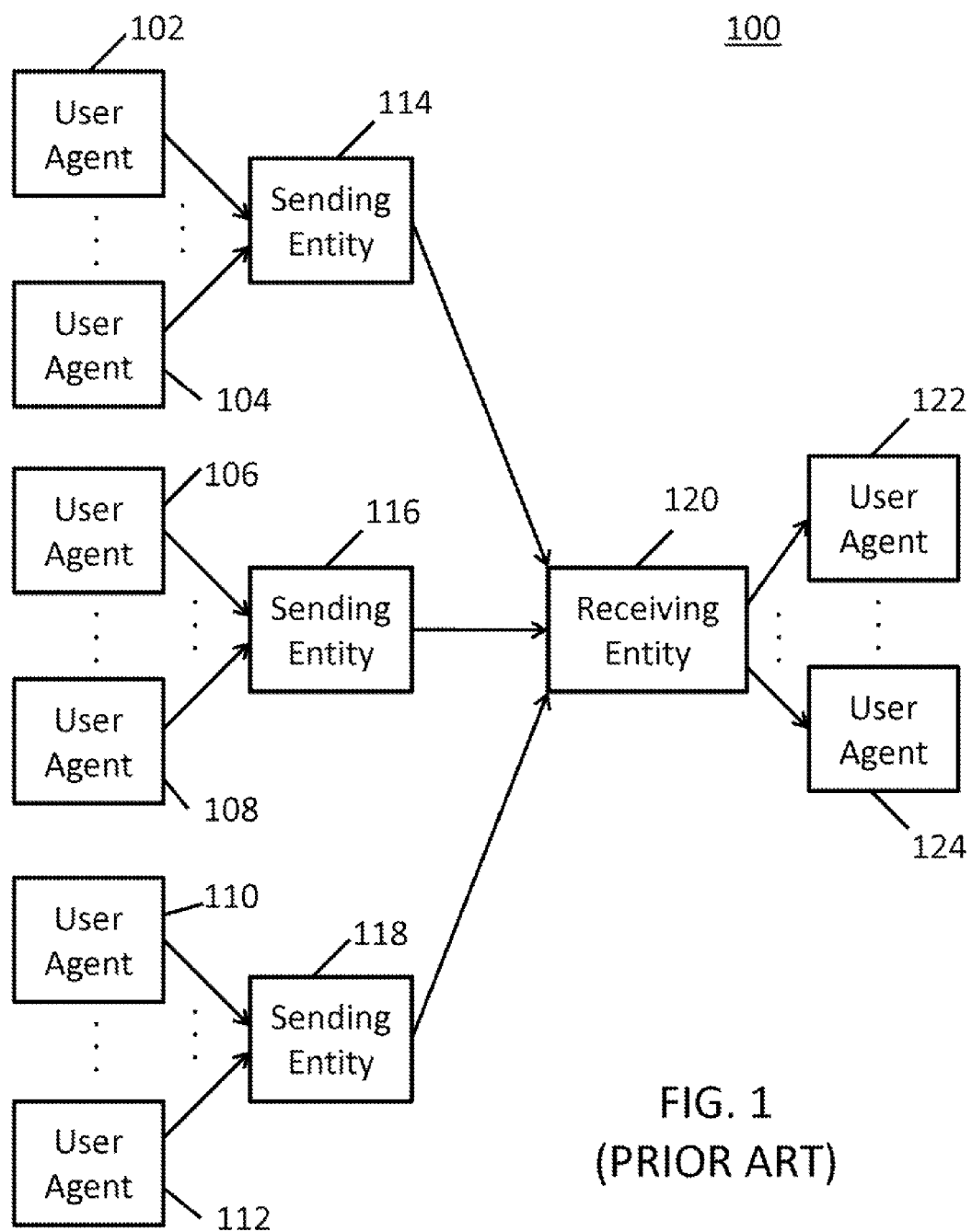
FIG. 1 is a diagram of a Session Initiation Protocol network connecting user agents, sending entity servers, and receiving entity servers in accordance with some embodiments.

Turning to FIG. 1, an example 100 of such a Session Initiation Protocol (SIP) environment in accordance with some embodiments is shown. As illustrated, environment 100 includes sending user agents 102, 104, 106, 108, 110, and 112, sending entity servers 114, 116, and 118, a receiving server 120, and receiving user agents 122 and 124. User agents 102, 104, 106, 108, 110, 112, 122, and 124 can be any suitable devices, such as mobile phones, Voice over IP (VoIP) phones, special purpose computers, general purpose computers, cameras, microphones, audio systems, audio and/or video conferencing systems, or any other suitable device. Although eight user agents are shown, any suitable number of user agents can be used in some embodiments. Servers 114, 115, 118, and 120 can be any suitable servers in some embodiments, such as proxy servers, registrations servers, etc., and, although four servers are shown, any suitable number can be used. Servers 114, 115, 118, and 120 can include any suitable hardware or physical components (such as one or more processors, such as microprocessors, digital signal processors, programmable logic devices, etc. for performing, among other things, the processes described herein), memory, interfaces, displays, input devices (such as keyboards, mice, etc.), storage devices (such as disk drives, etc.), etc. User agents 102, 104, 106, 108, 110, and/or 112 can establish a call session with user agents 122 and/or 124 for any suitable purpose, such as telephone calls, multimedia distribution, video conferencing, presence service, instant messaging, etc.

Figure 2:
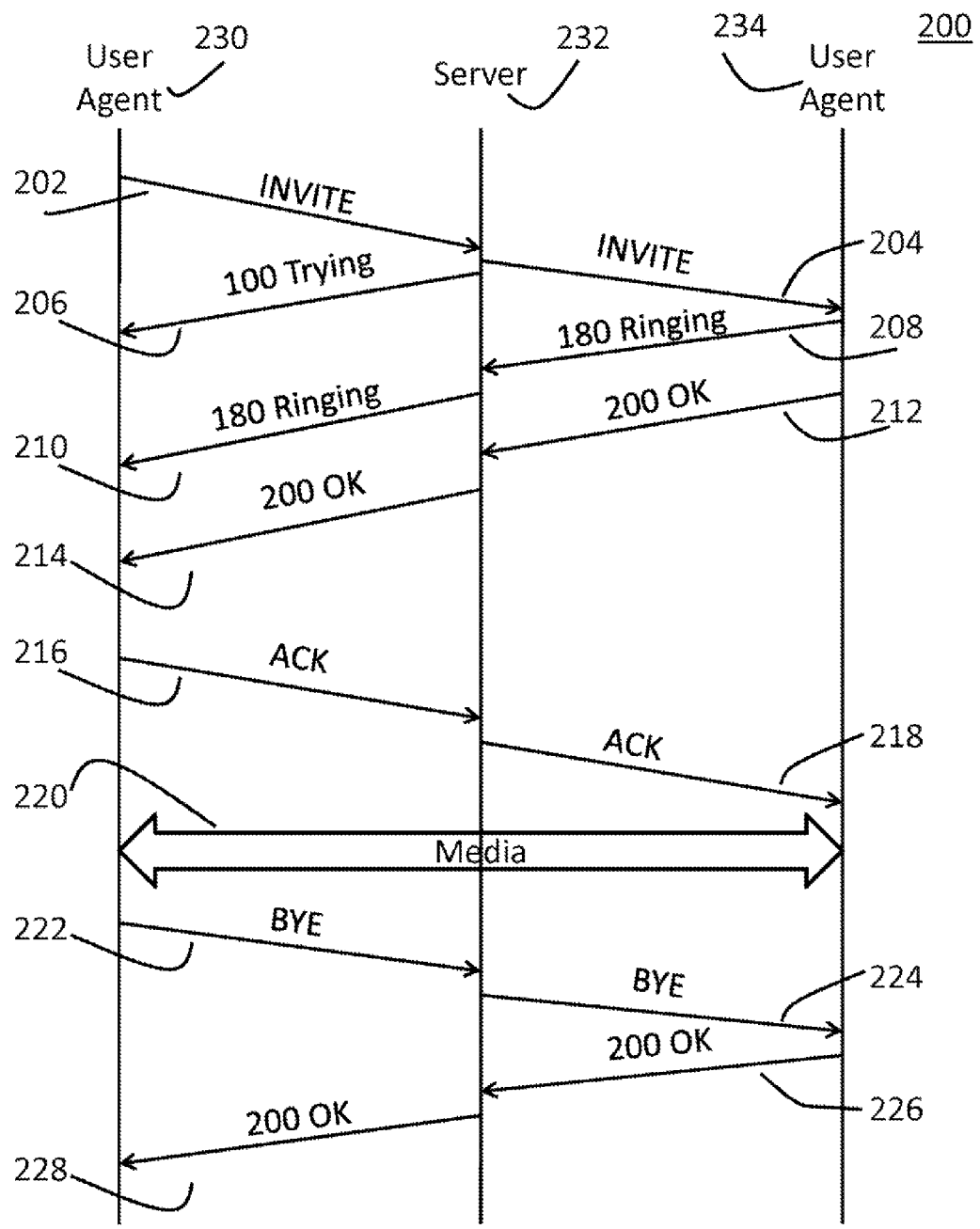
FIG. 2 is a diagram of a Session Initiation Protocol call set-up in accordance with some embodiments.

As described above, when sending user agents 102, 104, 106, 108, 110, and 112 are actively trying to establish a session with one or more of user agents 122 and 124, receiving entity server 120 can be overloaded by messages from sending entity servers 114, 116, and 118 which are proxying the sending user agents. FIG. 2 illustrates an example 200 of a process for establishing a session between user agents 230 and 234 via one or more intermediate servers 232 in accordance with some embodiments. As shown, an INVITE message 202 is initially sent from user agent 230 to servers 232. In response, servers 232 send an INVITE message 204 to user agent 234 and then send a 100 Trying message 206 back to user agent 230. User agent 234 responds to message 204 by sending a 180 Ringing message 208 back to servers 232, which forward the message as 180 Ringing message 210. Once the session has been accepted at user agent 234 (for example, by a user picking up the handset of a telephone user agent), a 200 OK message 212 is sent from user agent 234 to servers 232, and the message forwarded to user agent 230 as 200 OK message 214. Upon receiving the 200 OK message 214, user agent 230 acknowledges the session acceptance by sending an ACK message 216 to servers 232, which forward the message as an ACK message 218. Once the session has been established in this way, media 220 can flow between user agents 230 and 234. For example, this media can be a telephone conversation's two-way audio. Once the session is completed (for example, because the callers are done with their conversation), a BYE message 222 can be sent by one of the user agents (for example, here user agent 230) to servers 232, and forwarded to the other user agent (for example, here user agent 234) as BYE message 224. Upon receipt of BYE message 224, the other user agent can then send a 200 OK message 226 to servers 232, which can then forward the message as 200 OK message 228.

As mentioned above, in various scenarios, a receiving entity server can become overloaded with session acceptance messages from sending entity servers. For example, when a very large number of callers attempt to call the same telephone number at the same time, such as in a contest or in connection with a call-in television show, one or more sending entity servers can overload a receiving entity server corresponding to that telephone number.

Figure 3:
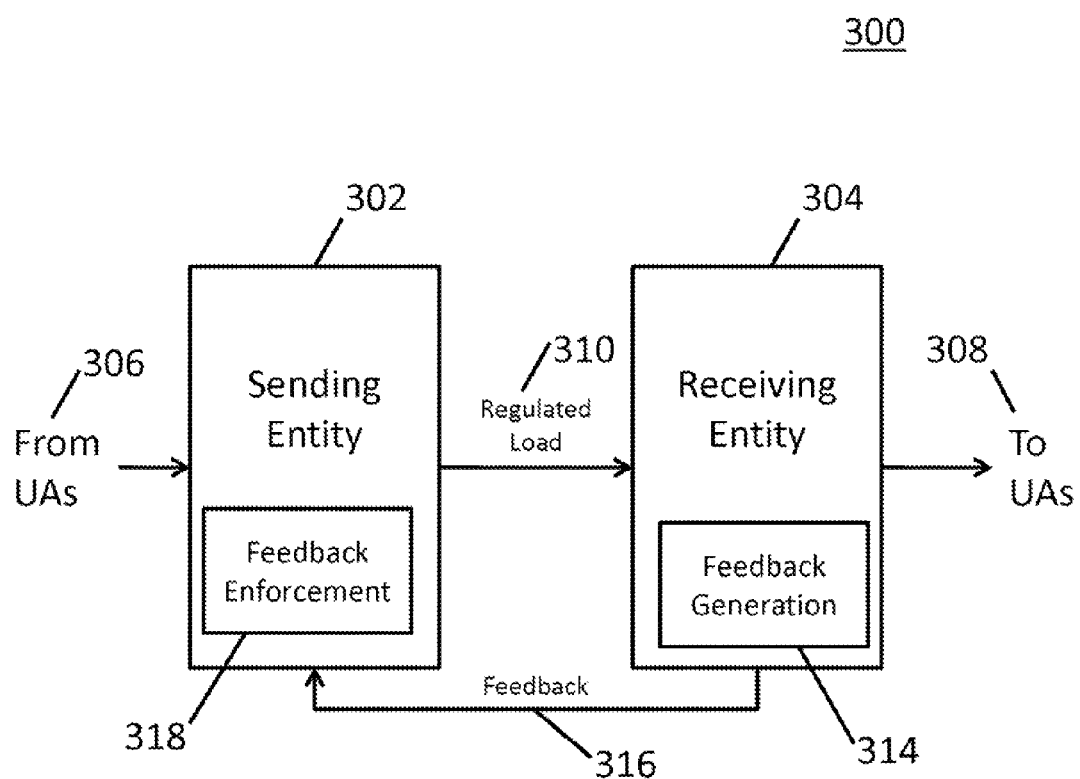
FIG. 3 is a diagram of a connection between a sending entity server and a receiving entity server incorporating feedback in accordance with some embodiments.

As shown in FIG. 3, in accordance with some embodiments, a mechanism 300 for controlling server load can provide feedback 316 from a receiving entity server 304 to one or more sending entity servers 302. This feedback can be generated in a feedback generation mechanism 314 in server 304 and be provided to a feedback enforcement mechanism 318 in server 302. When messages from user agents 306 are received at sending entity 302, based on the feedback, the feedback enforcement mechanism can control how many sessions are established as part of a regulated load 310 to receiving entity 304 and then onto user agents 308. For example, in some embodiments, the feedback can indicate the number of sessions that can be established during a control interval. Based on the load received from the one or more sending entity servers, feedback generation mechanism 314 can update the feedback provided to the sending entities to compensate for any increase or decrease in load at the receiving entity server.

Any suitable processes for generating feedback and enforcing feedback in mechanisms 314 and 318, respectively, can be used in some embodiments. Turning to FIGS. 4-6*b*, examples of processes for generating feedback that can be used in some embodiments are illustrated.

Figure 4:
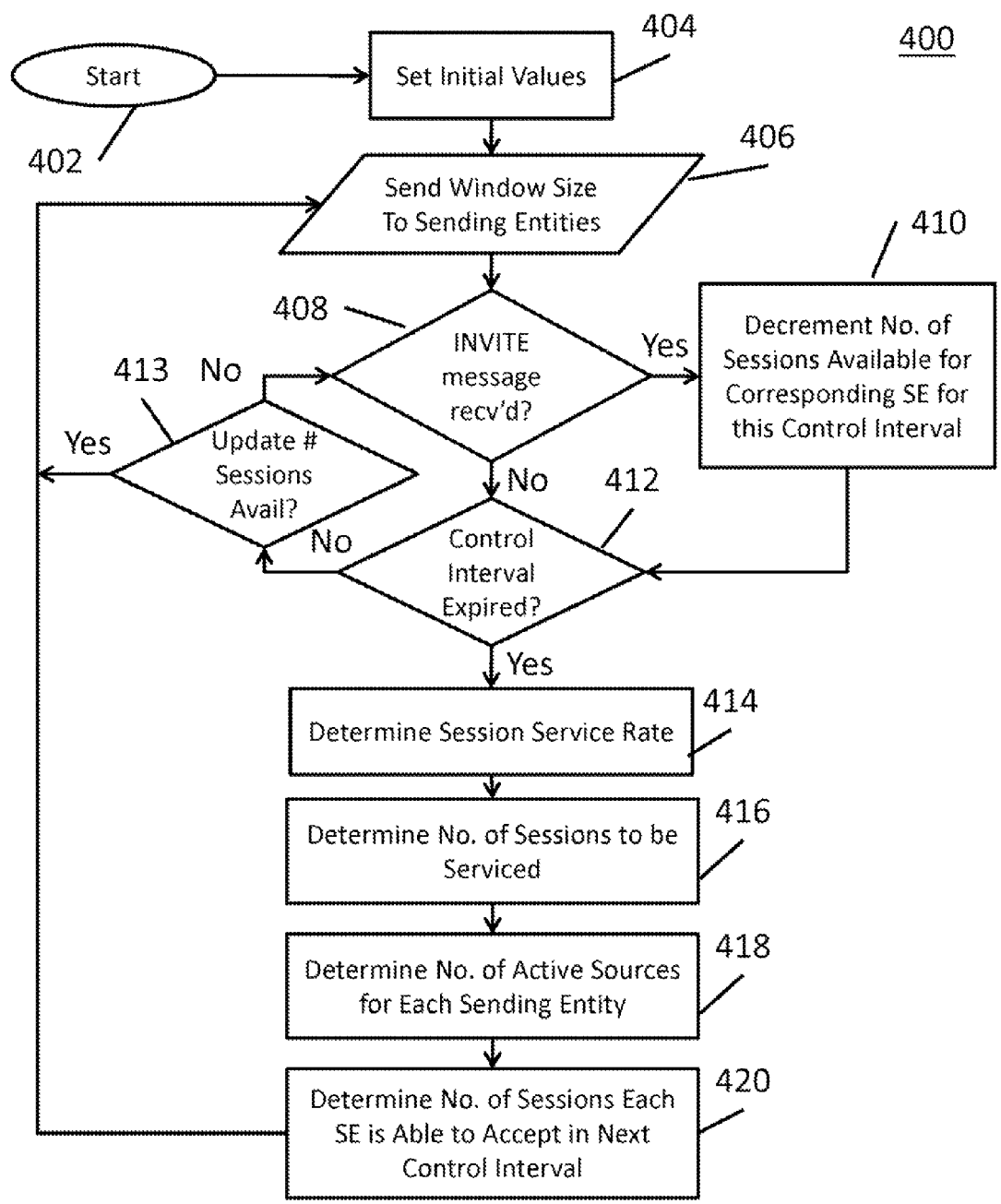
FIG. 4 is a diagram of a first process for generating feedback in accordance with some embodiments.

FIG. 4 shows a first example 400 of a process that can be used to provide feedback from a receiving entity server to one or more sending entity servers. In process 400, this can be performed at the end of each of a series of control intervals.

After process 400 begins at 402, the process can first set initial values at 404. These initial values can include any suitable values to be initialized, such as an initial number of sessions that can be established (i.e., a window size) for the first control interval. This initial number of sessions that can be established for each sending entity i can be set as:

$$w_i^0 := W_0$$

wherein:
 $w_i^0$ is the window size for sending entity i during the initial control interval; and
 $W_0$ is the initial positive, non-zero-valued window size, such as $W_0 = \mu_{eng} T_c$, where $\mu_{eng}$ is a server's engineered service rate, and $T_c$ is the length of the control interval.

Next, the window size can be sent, at 406, from the receiving entity server to each sending entity server. This can be performed in any suitable manner, such as sending the feedback in an out-of-band channel or in an in-band channel (such as in the next, or an upcoming, message to be sent from the receiving entity server to the corresponding sending entity server).

At 408, it can then be determined if an INVITE message has been received by the receiving entity server. If it is determined that an INVITE message has been received, then, at 410, the number of sessions available for the corresponding sending entity server for the present control interval can be decremented as follows:

$$w_i^k := wz_i^k - 1$$

wherein:
 $w_i^k$ is the window size for sending entity i during the current control interval k.

The receipt of INVITE messages, and corresponding BYE messages, can also be tracked for subsequent determination, at 414, of session service rates.

After decrementing the number of sessions available at 410, or after it is determined that an INVITE message was not received at 408, it can be determined, at 412, if the current control interval k has expired, or is about to expire. This expiration can occur at the end of each period having a duration of $T_c$, which can be 200 ms or any other suitable value in some embodiments. If it is determined that the current control interval k has not expired, or is not about to expire, then process 400 can determine whether to update the number of sessions available at 413. Any suitable criteria or criterion can be used to determine whether to update the number of sessions available. For example, in some embodiments, the number of sessions available can be sent every nth message to the sending entity server (where n is any suitable value). If the number of sessions available is to be updated, process 400 can branch to 406. Otherwise process 400 can branch to 408.

If it is determined at 412 that the control interval has expired, process 400 can proceed to 414 where it can determine the session service rate. Any suitable mechanism for determining the session service rate can be used. For example, in accordance with some embodiments, the session service rate can be determined by performing a "full session check" by counting how many sessions have been started and completed within a measurement interval. As a more particular example, this full session check can be accomplished with SIP call sessions by monitoring the number of sessions including an INVITE message and a BYE message during the measurement interval. As another example, in accordance with some embodiments, the session service rate can be determined by performing a "start session check" by counting how many sessions have been started—for example, by counting the number of new INVITE messages received—during the measurement interval. As a more particular example, this start session check can be accomplished by calculating the current session service rate, $\mu^k$, as:

$$\mu^k = N_{inv}^{accepted}/T_m$$

wherein:
$N_{inv}^{accepted}$ is the number of INVITE messages accepted; and
$T_m$ is the length of the measurement interval and can have a value of 100 ms or any other suitable value, and, in some embodiments, $T_m$ has a value between 100 ms and the length, $T_c$, of the control interval.

In some embodiments, standard smoothing functions can be applied to $\mu^k$.

Next, at 416, the number of sessions remaining to be serviced during the next control interval from the previous control interval can be determined. For example, in accordance with some embodiments, the number of sessions remaining to be serviced can be estimated as follows:

$$N_{sess} = N_{inv} + \frac{N_{noninv}}{L_{sess}-1}$$

wherein:
$N_{inv}$=the number of INVITE messages in the receiving entity server's queue;
$N_{noninv}$=the number of non-INVITE messages in the queue; and
$L_{sess}$=the average number of messages per session.

The average number of messages per session, $L_{sess}$, can be determined based on whether a full session check or a start session check is used to determine the session service rate. When a full session check is used, the length of each individual session can be counted by checking the start and end of each individual session, reflected, for example, by SIP INVITE and BYE messages. With the start session check, the session length can be obtained by counting the actual number of messages $N_{msg}^{proc}$ processed during the same period the session acceptance rate is observed, and estimating the session length as:

$$L_{sess} = N_{msg}^{proc}/N_{inv}^{accepted}$$

The number of active sources, $N_{SE}^k$, for each sending entity can next be determined at 418. For example, in some embodiments, the number of active sources can be determined by maintaining a table of sources of incoming load for each sending entity, expiring each entry in the table every second (e.g., to reduce the memory state), and maintaining a count of the sources.

At 420, the number of sessions each sending entity is able to accept in the next control interval can be determined. In some embodiments, this number of sessions can be determined as follows:

$$w^{k+1} := \mu^k T_c + \mu^k D_B - N_{sess}^k$$

$$w_i^{k+1} := \text{round}(w^{k+1}/N_{SE}^k)$$

wherein:
$w_i^{k+1}$ is the window size for sending entity i during the next control interval k+1;
$\mu^k$ is the current estimated session service rate determined at 414;
$T_c$ is the length of the control interval and can have a value of 200 ms or any other suitable value;
$D_B$ reflects the allowed budget message queuing delay and can have a value of 200 ms or any other suitable value;
$N_{sess}^k$, is the estimated number of sessions remaining in the system at the end of the current control interval k determined at 416; and
$N_{SE}^k$ is the number active sources in the current control interval k determined at 41.8.

Once the number of sessions each sending entity is able to accept in the next control interval has been determined, process 400 loops back to 406 to send the updated window sizes to the sending entity servers.

Figure 5A:
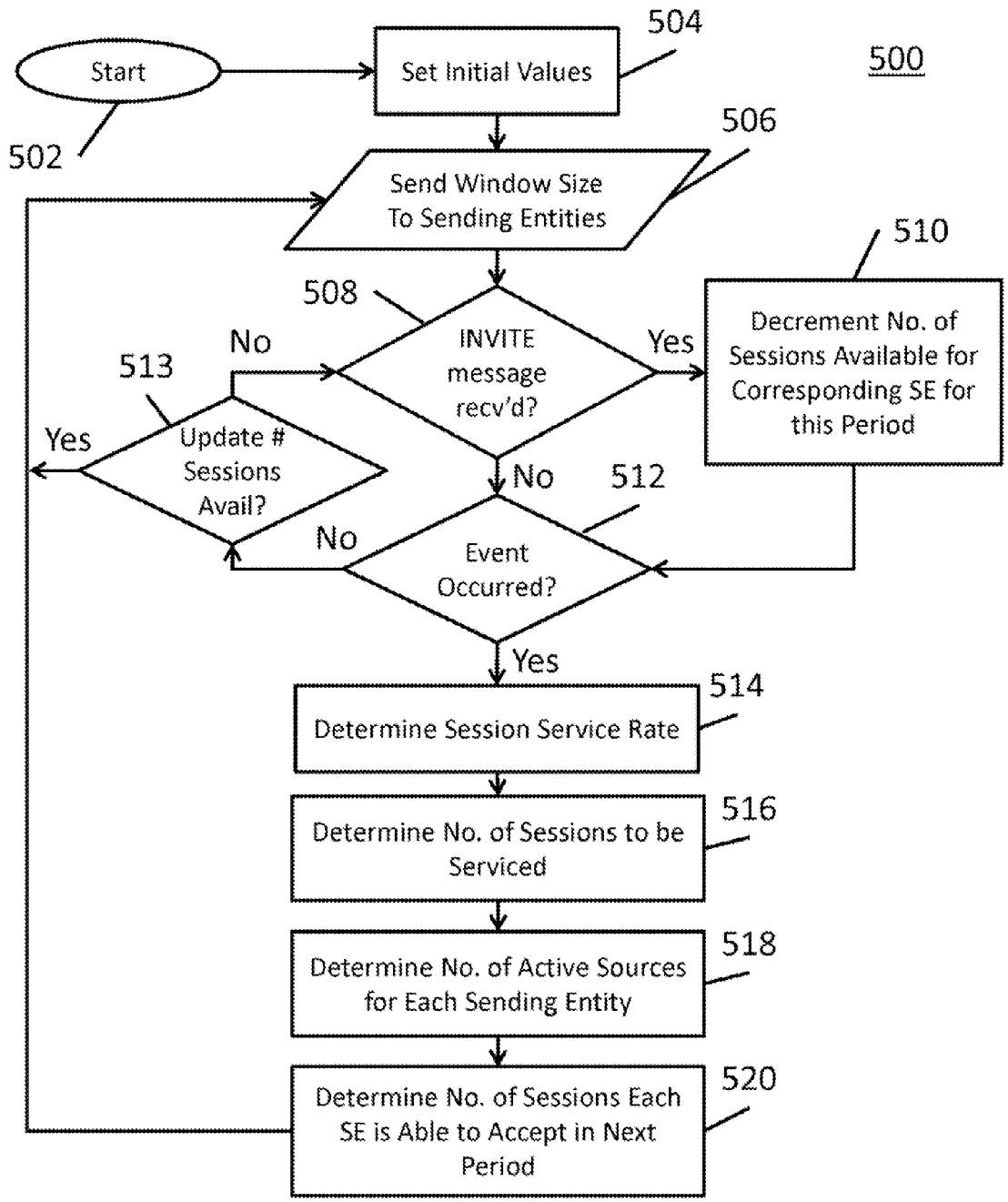
FIG. 5a is a diagram of a second process for generating feedback in accordance with some embodiments.

FIG. 5a shows a second example 500 of a process that can be used to generate feedback to be provided from a receiving entity server to one or more sending entity servers. In process 500, this can be performed in response to one or more recurring events defining the bounds of periods t of time, such as any message being processed by the receiving entity server, an INVITE message being processed by the receiving entity server, etc.

After process 500 begins at 502, the process can first set initial values at 504. These initial values can include any suitable values to be initialized, such as an initial number of sessions that can be established (i.e., a window size) for the period prior to the occurrence of the first event. This initial number of sessions that can be established for each sending entity i can be set as:

$$w_i^0 := W_0$$

wherein:
$w_i^0$ is the initial window size for sending entity i; and
$W_0$ is the initial positive, non-zero-valued window size, such as $W_0 = \mu_{eng} T_c$, where $\mu_{eng}$ is a server's engineered service rate, and $T_c$ is the estimated length of the initial period t. Temporary variables can also be initialized at this step. For example, the following temporary variable, the use of which is described below at 520, can be initialized as:

$$w_{i'}^0 := 0$$

Next, the window size can be sent, at 506, from the receiving entity server to the sending entity server. This can be performed in any suitable manner, such as sending the feedback in an out-of-band channel or in an in-band channel (such as in the next, or an upcoming, message to be sent from the receiving entity server to the corresponding sending entity server).

At 508, it can then be determined if an INVITE message has been received by the receiving entity server. If it is determined that an INVITE message has been received, then, at 510, the number of sessions available for the corresponding sending entity server for the present period t can be decremented as follows:

$$w_i^t := w_i^t - 1$$

wherein:

$w_i^t$ is the window size for sending entity i during the current period t.

The receipt of INVITE messages, and corresponding BYE messages, can also be tracked for subsequent determination, at 514, of session service rates.

After decrementing the number of sessions available at 510, or after it is determined that an INVITE message was not received at 508, it can be determined, at 512, if the specified event, or one of the specified events, has occurred, thus expiring the current period t. If it is determined that the event has not occurred, then process 500 can determine whether to update the number of sessions available at 513. Any suitable criteria or criterion can be used to determine whether to update the number of sessions available. For example, in some embodiments, the number of sessions available can be sent every nth message to the sending entity server (where n is any suitable value). If the number of sessions available is to be updated, process 500 can branch to 506. Otherwise process 500 can branch to 508.

If it is determined at 512 that the control interval has expired, process 500 can proceed to 514 where it can determine the session service rate. As above, any suitable mechanism for determining the session service rate can be used. For example, in accordance with some embodiments, the session service rate can be determined by performing a "full session check" by counting how many sessions have been started and completed within a measurement interval. As a more particular example, this full session check can be accomplished with SIP call sessions by monitoring the number of sessions including an INVITE message and a BYE message during the measurement interval. As another example, in accordance with some embodiments, the session service rate can be determined by performing a "start session check" by counting how many sessions have been started—for example, by counting the number of new INVITE messages received—during the measurement interval. As a more particular example, this start session check can be accomplished by calculating the current session service rate, $\mu^t$, as:

$$\mu^t = N_{inv}^{accepted} / T_m$$

wherein:

$N_{inv}^{accepted}$ is the number of INVITE messages accepted; and $T_m$ is the length of the measurement interval and can have a value of 100 ms or any other suitable value, and, in some embodiments, $T_m$ has a value between 100 ms and the duration of period t.

In some embodiments, standard smoothing functions can be applied to $\mu^t$.

Next, at 516, the number of sessions remaining to be serviced during the next period from the previous period can be determined. For example, in accordance with some embodiments, the number of sessions remaining to be serviced can be estimated as follows:

$$N_{sess} = N_{inv} + \frac{N_{noninv}}{L_{sess} - 1}$$

wherein:

$N_{inv}$ = the number of INVITE messages in the receiving entity server's queue;

$N_{noninv}$ = the number of non-INVITE messages in the queue; and $L_{sess}$ = the average number of messages per session.

The average number of messages per session, $L_{sess}$, can be determined based on whether a full session check or a start session check is used to determine the session service rate. When a full session check is used, the length of each individual session can be counted by checking the start and end of each individual session, reflected, for example, by SIP INVITE and BYE messages. With the start session check, the session length can be obtained by counting the actual number of messages $N_{msg}^{proc}$ processed during the same period the session acceptance rate is observed, and estimating the session length as:

$$L_{sess} = N_{msg}^{proc} / N_{inv}^{accepted}$$

The number of active sources, $N_{SE}^t$, for each sending entity can next be determined at 518. For example, in some embodiments, the number of active sources can be determined by maintaining a table of sources of incoming load for each sending entity, expiring each entry in the table every second (e.g., to reduce the memory state), and maintaining a count of the sources.

At 520, the number of sessions each sending entity is able to accept in the next period is determined. In some embodiments, this number of sessions, $w_i^{t+1}$, can be determined as follows:

$$N_{sess}^{max} := \mu^t D_B$$

$$w_{left}^t := N_{sess}^{max} - N_{sess}$$

if $(w_{left}^t \geq 1)$ $$w_{share}^t := w_{left}^t / N_{SE}^t$$

$$w_i^t := w_i^t + w_{share}^t$$

if $(w_i^t \geq 1)$ $$w_i^{t+1} := (int) w_i^t$$

$$w_i^t := (frac) w_i^t$$

wherein:

$\mu^t$ is the current estimated session service rate determined at 514;

$D_B$ reflects the allowed budget message queuing delay and can have a value of 200 ms or any other suitable value;

$N_{sess}$ is the number of sessions remaining to be serviced determined at 516

$N_{SE}^t$ is the number active sources for a sending entity in the current period t determined at 518;

(int) is an operator which returns the integer part of the operand; and (frac) is an operator which returns the fractional part of the operand.

Once the number of sessions each sending entity is able to accept in the next period has been determined, process 500 loops back to 506 to send the updated window sizes to the sending entity servers. In some embodiments, before sending the updated window sizes to the sending entity servers, process 500 can determine whether the window sizes for the sending entities for the next period are sufficiently different from the sizes for the previous period. This determination can be made on a server-by-server basis, based on the aggregate change across all sending entity servers, or based on any other suitable criteria or criterion.

Figure 5B:
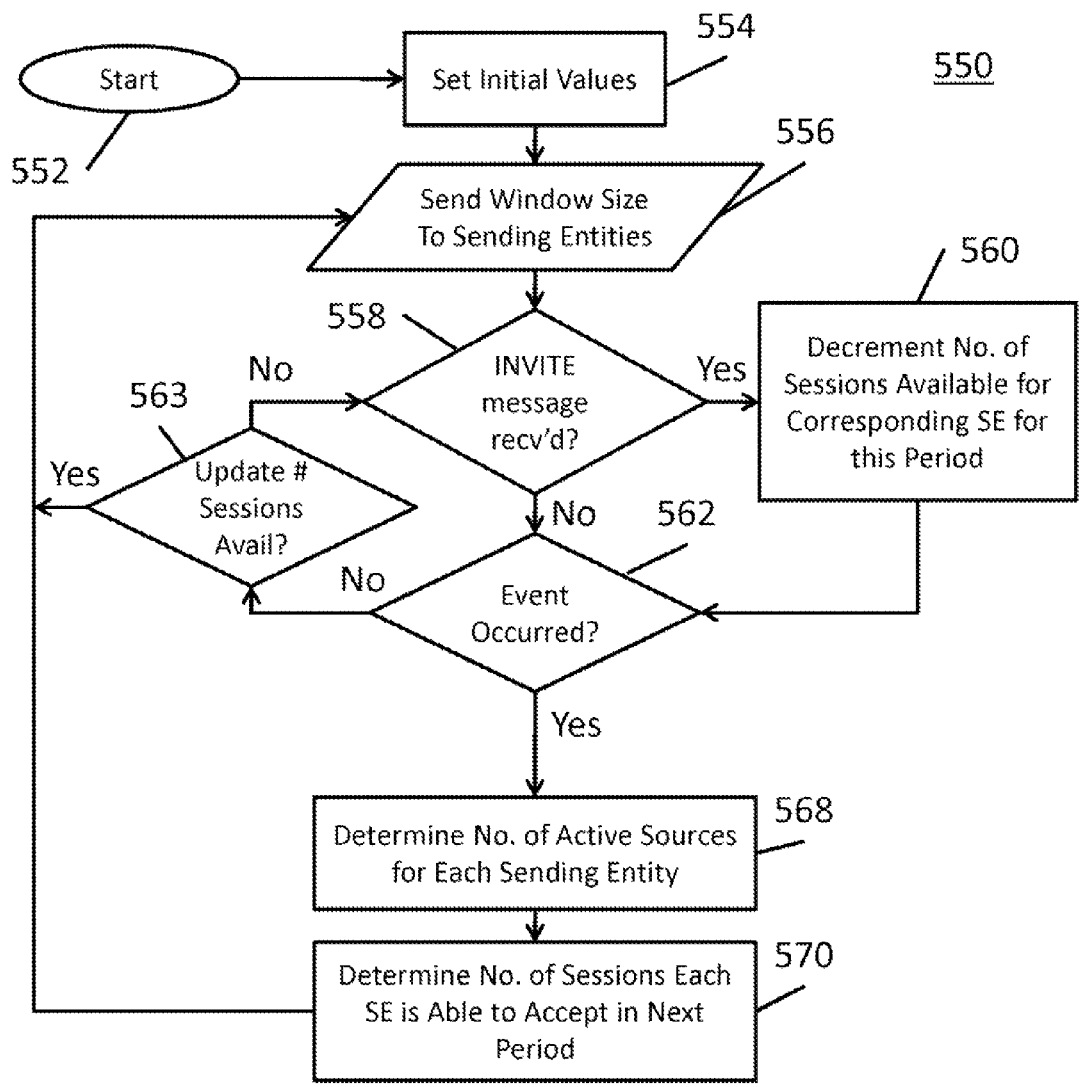
FIG. 5b is a diagram of a third process for generating feedback in accordance with some embodiments.

FIG. 5b shows a third example 550 of a process that can be used to generate feedback to be provided from a receiving entity server to one or more sending entity servers. In process 550, this can similarly be performed in response to one or more recurring events defining the bounds of periods t of time, such as any message being processed by the receiving entity server, an INVITE message being processed by the receiving entity server, etc.

After process 550 begins at 552, the process can first set initial values at 554. These initial values can include any suitable values to be initialized, such as an initial number of sessions that can be established (i.e., a window size) for the period prior to the occurrence of the first event. This initial number of sessions that can be established for each sending entity i can be set as:

$$w_i^0 := W_0$$

wherein:
$w_i^0$ is the initial window size for sending entity i; and
$W_0$ is the initial positive, non-zero-valued window size, such as $W_0 = \mu_{eng} T_x$, where $\mu_{eng}$ is a server's engineered service rate, and $T_c$ is the estimated length of the initial period t. Temporary variables can also be initialized at this step. For example, the following temporary variable, the use of which is described below at 570, can be initialized as:

$$w_i^0 := 0$$

Next, the window size can be sent, at 556, from the receiving entity server to each sending entity server. This can be performed in any suitable manner, such as sending the feedback in an out-of-band channel or in an in-band channel (such as in the next, or an upcoming, message to be sent from the receiving entity server to the corresponding sending entity server).

At 558, it can then be determined if an INVITE message has been received by the receiving entity server. If it is determined that an INVITE message has been received, then, at 560, the number of sessions available for the corresponding sending entity server for the present period t can be decremented as follows:

$$w_i^t := w_i^t - 1$$

wherein:
$w_i^t$ is the window size for sending entity i during the current period t.

After decrementing the number of sessions available at 560, or after it is determined that an INVITE message was not received at 558, it can be determined, at 562, if the specified event, or one of the specified events, has occurred, thus expiring the current period t. If it is determined that the event has not occurred, then process 550 can determine whether to update the number of sessions available at 563. Any suitable criteria or criterion can be used to determine whether to update the number of sessions available. For example, in some embodiments, the number of sessions available can be sent every nth message to the sending entity server (where n is any suitable value). If the number of sessions available is to be updated, process 550 can branch to 556. Otherwise process 550 can branch to 558.

If it is determined at 562 that the control interval has expired, process 550 can proceed to 568 where it can determine the number of active sources, $N_{SE}^t$, for each sending entity. For example, in some embodiments, the number of active sources can be determined by maintaining a table of sources of incoming load for each sending entity, expiring each entry in the table every second (e.g., to reduce the memory state), and maintaining a count of the sources.

At 570, the number of sessions each sending entity is able to accept in the next period can be determined. As shown below, this number of sessions, $w_i^{t+1}$, can be determined as follows:

$$w_{left}^t = RE_{fb\ win\ preset} - N_{inv\ in\ q}$$

if ($w_{left}^t \geq 1$)

$$w_{share}^t := w_{left}^t / N_{SE}^t$$

$$w_i^t := w_i^t + w_{share}^t$$

if ($w_i^t \geq 1$)

$$w_i^{t+1} = (\text{int}) w_i^t$$

$$w_i^t := (\text{frac}) w_i^t$$

wherein:
$RE_{fb\ win\ preset}$ is limit on the number of new INVITE messages to be received (e.g., a small number such as 10);
$N_{inv\ in\ q}$ is the number of new INVITE messages in the receiving entity server processing queue;
$N_{SE}^t$ is the number active sources for a sending entity in the current period t determined at 568;
(int) is an operator which returns the integer part of the operand; and
(frac) is an operator which returns the fractional part of the operand.

Once the number of sessions each sending entity is able to accept in the next period has been determined, process 550 loops back to 556 to send the updated window sizes to the sending entity servers. In some embodiments, before sending the updated window sizes to the sending entity servers, process 550 can determine whether the window sizes for the sending entities for the next period are sufficiently different from the sizes for the previous period. This determination can be made on a server-by-server basis, based on the aggregate change across all sending entity servers, or based on any other suitable criteria or criterion.

Figure 6A:
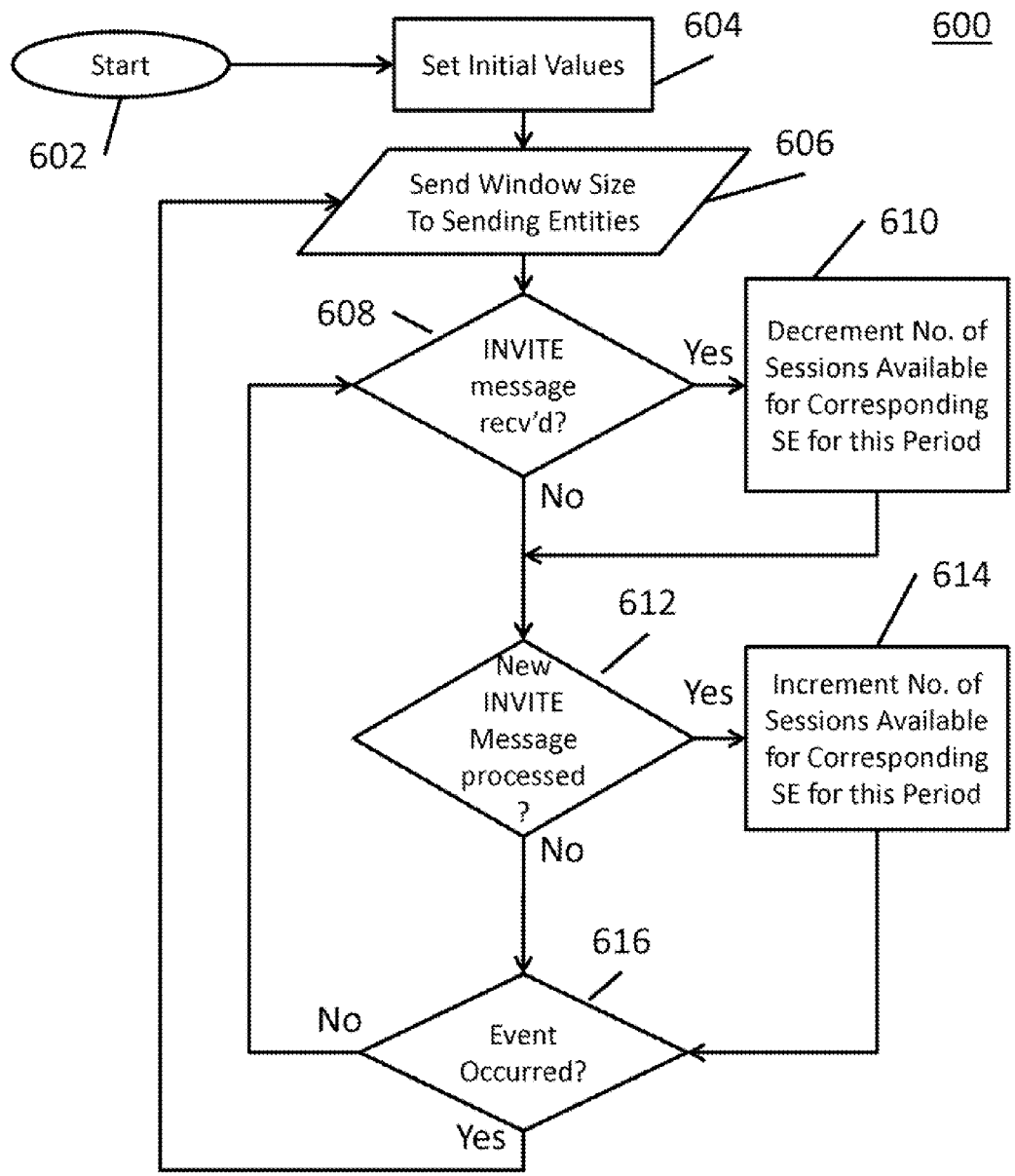
FIG. 6a is a diagram of a fourth process for generating feedback in accordance with some embodiments.

FIG. 6a shows a fourth example 600 of a process that can be used to generate feedback to be provided from a receiving entity server to one or more sending entity servers. In process 600, this can be performed in response to one or more recurring events defining the bounds of periods t of time, such as any message being processed by the receiving entity server, an INVITE message being processed by the receiving entity server, a window size reaching or being below a certain value, each change in a window size, etc.

After process 600 begins at 602, the process can first set initial values at 604. These initial values can include any suitable values to be initialized, such as an initial number of sessions that can be established (i.e., a window size) for the period prior to the occurrence of the first event. This initial number of sessions that can be established for each sending entity i can be set as:

$$w_i^0 := W_0$$

wherein:
 $w_i^0$ is the initial window size for sending entity i; and
 $W_0$ is the initial positive, non-zero-valued window size, such as $W_0 = \mu_{eng} T_c$, where $\mu_{eng}$ is a server's engineered service rate and $T_c$ is the estimate length of the initial period t.

Next, the window size can be sent, at 606, from the receiving entity server to the sending entity servers. This can be performed in any suitable manner, such as sending the feedback in an out-of-band channel or in an in-band channel (such as in the next, or an upcoming, message to be sent from the receiving entity server to the corresponding sending entity server).

At 608, it can then be determined if an INVITE message has been received by the receiving entity server. If it is determined that an INVITE message has been received, then, at 610, the number of sessions available for the corresponding sending entity server for the present period t can be decremented as follows:

$$w_i^t := w_i^t - 1$$

wherein:
 $w_i^t$ is the window size for sending entity i during the current period t.

After decrementing the number of sessions available at 610, or after it is determined that an INVITE message was not received at 608, it can be determined, at 612, if a new INVITE message has been processed. If it is determined that a new INVITE message has been processed, then, at 614, the number of sessions available for the corresponding sending entity server for the present period t can be incremented as follows:

$$w_i^t := w_i^t + 1$$

After incrementing the number of sessions available at 614, or after it is determined that a new INVITE message was not processed at 612, it can be determined, at 616, if the specified event, or one of the specified events, has occurred, thus expiring the current period t. If it is determined that the event has not occurred, then process 600 can loop back to 608. Otherwise, process 600 can loop back to 606 to send the updated window sizes to the sending entity servers. In some embodiments, before sending the updated, increased window sizes to the sending entity servers, process 600 can determine whether the queuing delay for the receiving entity server has exceeded a given threshold (e.g., 250 ins, or half of the SIP $T_1$ time value for resending an unresponded-to INVITE message). If the queuing delay exceeds this threshold, then the process can select to not send increased window sizes for the sending entities.

In some instances, it may not be possible or desirable to simply decrement or increment the sessions available for a corresponding sending entity as discussed above in 610 and 614. For example, this may be the case because the window size of a sending entity may be too small to decrement or because an increment in window size that would be provided for the corresponding entity is needed more for another entity. In such cases, rather than performing what is described in 610 and 614 as discussed above, in some embodiments, a pool of window slots can instead be maintained and, when an empty slot becomes available, the slot can be assigned to a sending entity based on any suitable criteria or criteria, such as equal or proportional allocation.

Figure 6B:
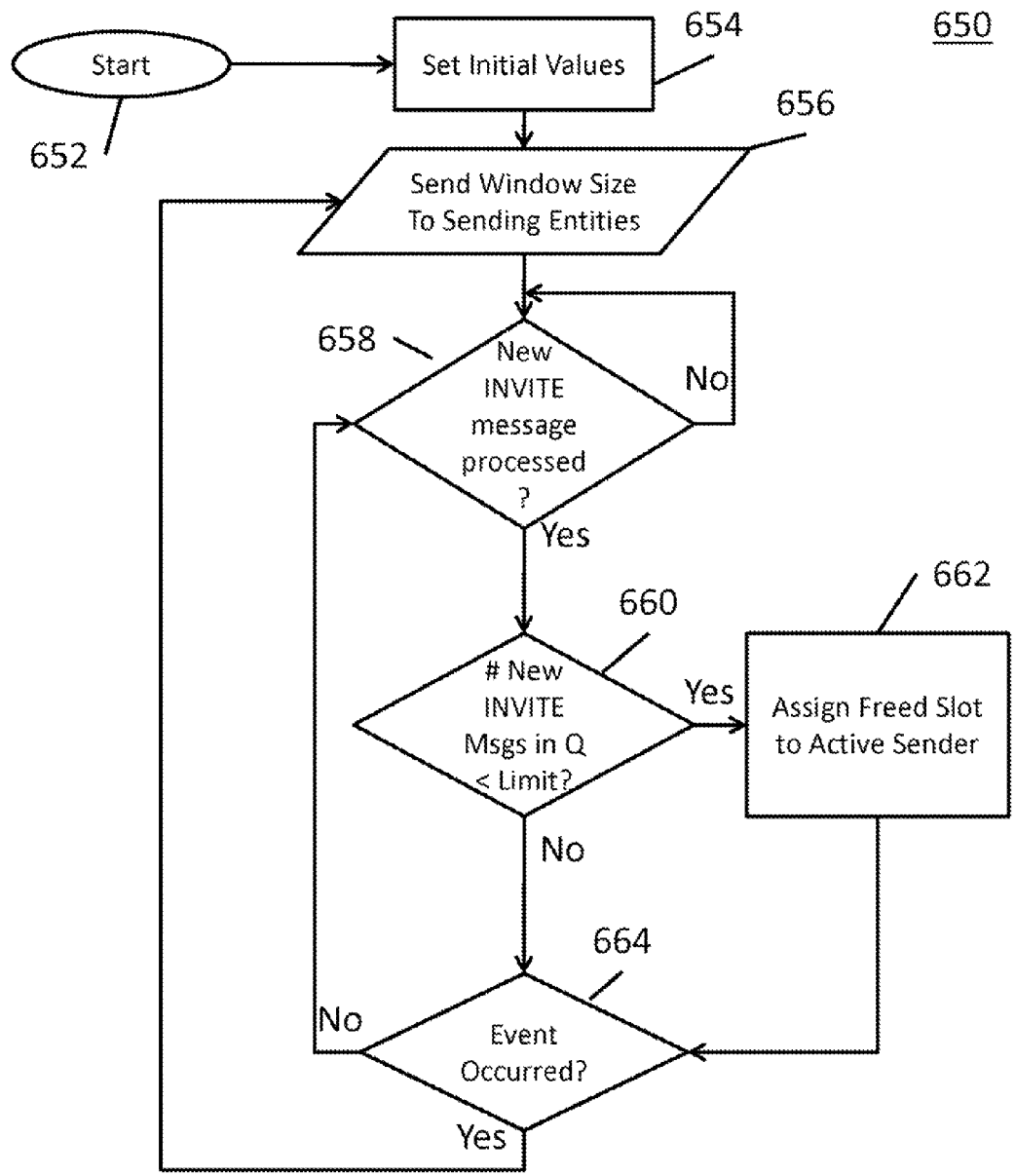
FIG. 6b is a diagram of a fifth process for generating feedback in accordance with some embodiments.

FIG. 6b shows a fifth example 650 of a process that can be used to generate feedback to be provided from a receiving entity server to one or more sending entity servers. In process 650, this can similarly be performed in response to one or more recurring events defining the bounds of periods t of time, such as any message being processed by the receiving entity server, an INVITE message being processed by the receiving entity server, a window size reaching or being below a certain value, each change in a window size, etc.

After process 650 begins at 652, the process can first set initial values at 654. These initial values can include any suitable values to be initialized, such as an initial number of sessions that can be established (i.e., a window size) for the period prior to the occurrence of the first event, a preset limit on the number of new INVITE messages, etc. The initial number of sessions that can be established for each sending entity i can be set as:

$$w_i^0 := W_0$$

wherein:
 $w_i^0$ is the initial window size for sending entity i; and
 $W_0$ is the initial positive, non-zero-valued window size, such as $W_0 = \mu_{eng} T_c$, where $\mu_{eng}$ is a server's engineered service rate and $T_c$ is the estimate length of the initial period t.

The preset limit can be set as: $RE_{fb\ win\ preset} = 10$ (or any other suitable value).

Next, the window size can be sent, at 656, from the receiving entity server to the sending entity servers. This can be performed in any suitable manner, such as sending the feedback in an out-of-band channel or in an in-band channel (such as in the next, or an upcoming, message to be sent from the receiving entity server to the corresponding sending entity server).

At 658, it can then be determined if a new INVITE message has been received by the receiving entity server. If it is determined that a new INVITE message has not been received, then process 650 can loop back to 658. Otherwise, process 650 can next determine, at 660, whether the number of new INVITE messages in the receiving entity server's queue is less than the preset limit. If it is, at 662, the process can assign the freed slot (i.e., the slot freed due to the completion of processing of the INVITE message) to an active sender using any suitable approach. For example, in some embodiments, the freed slot can be assigned using a proportional assignment algorithm (e.g., based on equal assignment, based up load at the sending entity server, etc.).

After assigning the freed slot at 662, or after it is determined that the number of new INVITE messages in the queue is not less than the preset limit at 660, it can be determined, at 664, if the specified event, or one of the specified events, has occurred, thus expiring the current period t. If it is determined that the event has not occurred, then process 650 can loop back to 658. Otherwise, process 650 can loop back to 656 to send the updated window sizes to the sending entity servers. In some embodiments, before sending the updated, increased window sizes to the sending entity servers, process 650 can determine whether the queuing delay for the receiving entity server has exceeded a given threshold (e.g., 250 ms, or half of the SIP $T_r$ time value for resending an unresponded-to INVITE message). If the queuing delay exceeds this threshold, then the process can select to not send increased window sizes for the sending entities.

Figure 7:
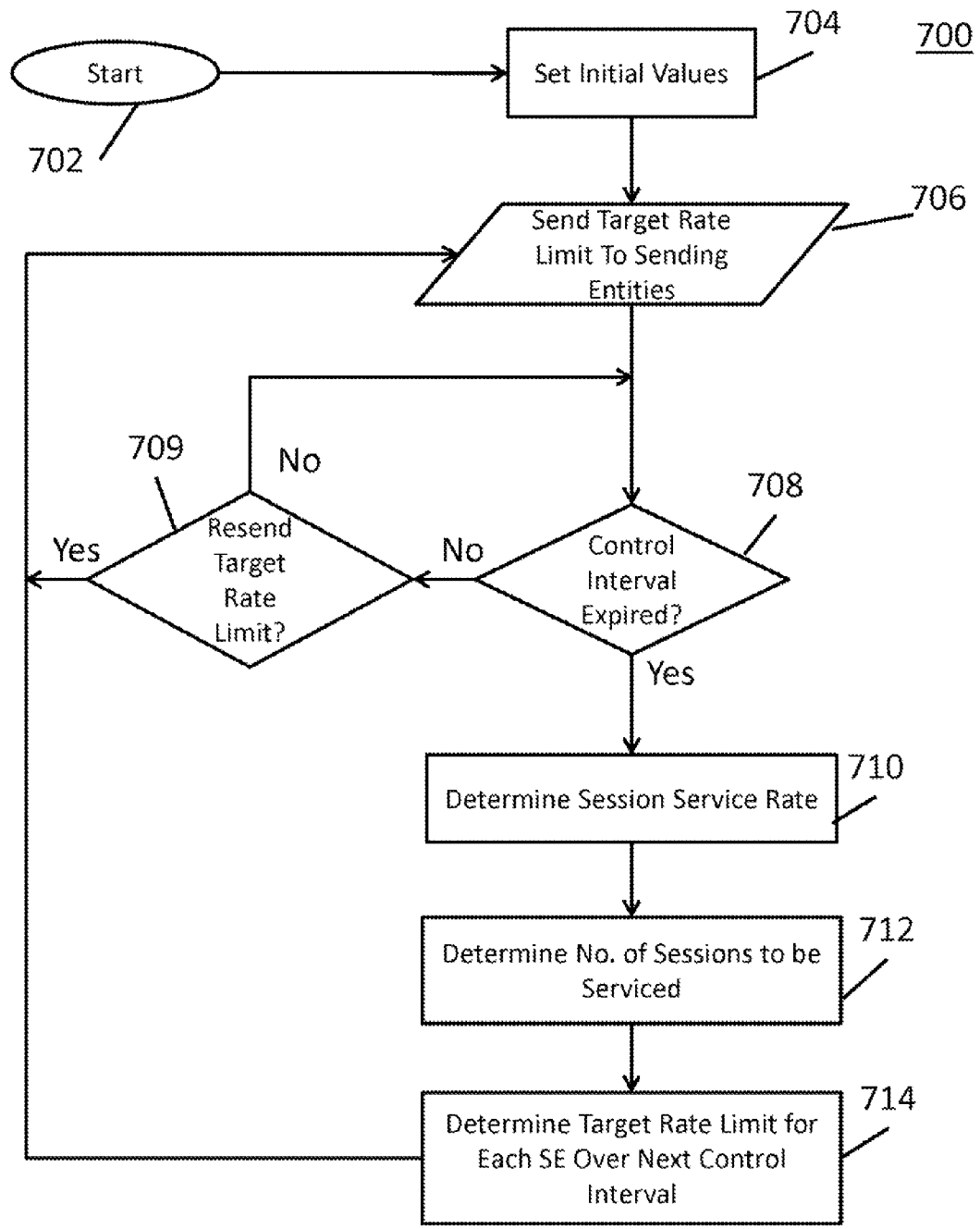
FIG. 7 is a diagram of a sixth process for generating feedback in accordance with some embodiments.

FIG. 7 shows a sixth example 700 of a process that can be used to generate feedback to be provided from a receiving entity server to one or more sending entity servers. As illustrated, after process 700 begins at 702, the process can first set initial values at 704. These initial values can include any suitable values to be initialized, such as an initial target rate limit for the first control interval. This initial target rate limit that can be established for each sending entity i can be set as:

$$\lambda_i^0 := L_0$$

wherein:
$\lambda_i^0$ is the target rate limit for sending entity i during the initial control interval; and
$L_0$ is the initial positive, non-zero-valued target rate limit, such as $L_0 = \mu_{eng}/N_{SE}^0$ where $\mu_{eng}$ is a server's engineered service rate, and $N_{SE}^0$ is number of sending entities during the initial interval.

Next, the target rate limit can be sent, at 706, from the receiving entity server to each sending entity server. This can be performed in any suitable manner, such as sending the feedback in an out-of-band channel or in an in-band channel (such as in the next, or an upcoming, message to be sent from the receiving entity server to the corresponding sending entity server).

At 708, it can be determined if the current control interval k has expired, or is about to expire. This expiration can occur at the end of each period having a duration of K, which can be 200 ms or any other suitable value in some embodiments. If it is determined that the current control interval k has not expired, or is not about to expire, then process 700 can branch to 709 where it determines whether to resend the target rate limit to the sending entities. Resending the target rate limit can be performed for any suitable purpose, such as redundancy of messages. If the target rate limit is to be resent, then process 700 can loop back to 706. Otherwise, process 700 can loop back to 708.

If it is determined that the current control interval k has expired, or is about to expire, then process 700 can proceed to 710 where it can determine the session service rate. Any suitable mechanism for determining the session service rate can be used. For example, in accordance with some embodiments, the session service rate can be determined by performing a "full session check" by counting how many sessions have been started and completed within a measurement interval. As a more particular example, this full session check can be accomplished with SIP call sessions by monitoring the number of sessions including an INVITE message and a BYE message during the measurement interval. As another example, in accordance with some embodiments, the session service rate can be determined by performing a "start session check" by counting how many sessions have been started—for example, by counting the number of new INVITE messages received—during the measurement interval. As a more particular example, this start session check can be accomplished by calculating the current session service rate, $\mu^k$, as:

$$\mu^k = N_{inv}^{accepted}/T_m$$

wherein:
$N_{inv}^{accepted}$ is the number of INVITE messages accepted; and
$T_m$ is the length of the measurement interval and can have a value of 100 ms or any other suitable value, and, in some embodiments, $T_m$ has a value between 100 ms and the length, $T_c$, of the control interval.

In some embodiments, standard smoothing functions can be applied to $\mu^k$.

Next, at 712, the number of sessions remaining to be serviced during the next control interval from the previous control interval can be determined. For example, in accordance with some embodiments, the number of sessions remaining to be serviced can be estimated as follows:

$$N_{sess} = N_{inv} + \frac{N_{noninv}}{L_{sess} - 1}$$

wherein:
$N_{inv}$ = the number of INVITE messages in the receiving entity server's queue;
$N_{noninv}$ = the number of non-INVITE messages in the queue; and
$L_{sess}$ = the average number of messages per session.

The average number of messages per session, $L_{sess}$, can be determined based on whether a full session check or a start session check is used to determine the session service rate. When a full session check is used, the length of each individual session can be counted by checking the start and end of each individual session, reflected, for example, by SIP INVITE and BYE messages. With the start session check, the session length can be obtained by counting the actual number of messages $N_{msg}^{proc}$ processed during the same period the session acceptance rate is observed, and estimating the session length as:

$$L_{sess} = N_{msg}^{proc}/N_{inv}^{accepted}$$

At 714, the target load for each sending entity in the next control interval can be determined. In some embodiments, this target load can be determined as follows:

$$\lambda_i^{k+1} := \mu^k \left(1 - \frac{(d_q^k - D_B)}{T_C}\right) / N_{SE}^k$$

wherein:
$\lambda_i^{k+1}$ is the target rate limit for sending entity i during the next control interval k+1;
$\mu^k$ is the current estimated session service rate determined at 710;
$d_q^k$ is the estimate server queuing delay at the end of the last measurement interval k, and can be estimated by: $d_q^k = N_{SESS}/\mu^k$, where $N_{sess}^k$ is the estimated number of sessions remaining in the system at the end of the current control interval k determined at 712;
$D_B$ reflects the allowed budget message queuing delay and can have a value of 200 ms or any other suitable value;
$T_c$ is the length of the control interval and can have a value of 200 ms or any other suitable value;
$N_{SE}^k$ is the number of sending entities during interval k.

Once the target rate limit for each sending entity in the next control interval has been determined, process 700 loops back to 706 to send the updated target rate limits to the sending entity servers.

In some embodiments, in any of these approaches to providing feedback, when the current number of active sessions is below a corresponding minimum threshold and the current maximum allocable window size is smaller than a corresponding minimum threshold, the current maximum allocable window size can be adjusted so that at least one sending entity server receives window size feedback that is greater than one.

In some embodiments, in any of the approaches to providing feedback in which a window size is provided as the feedback, when a receiving entity receives an INVITE message, the receiving entity can check the corresponding window size value for the corresponding sending entity and determine whether the INVITE message should be recognized and processed. When it is determined that an INVITE message will not be recognized and processed, the INVITE message can be rejected or dropped. In some embodiments, a receiving entity can maintain a single queue for storing all INVITE messages or it can maintain separate queues for INVITE messages from different sending entities or groups of sending entities.

Figure 8:
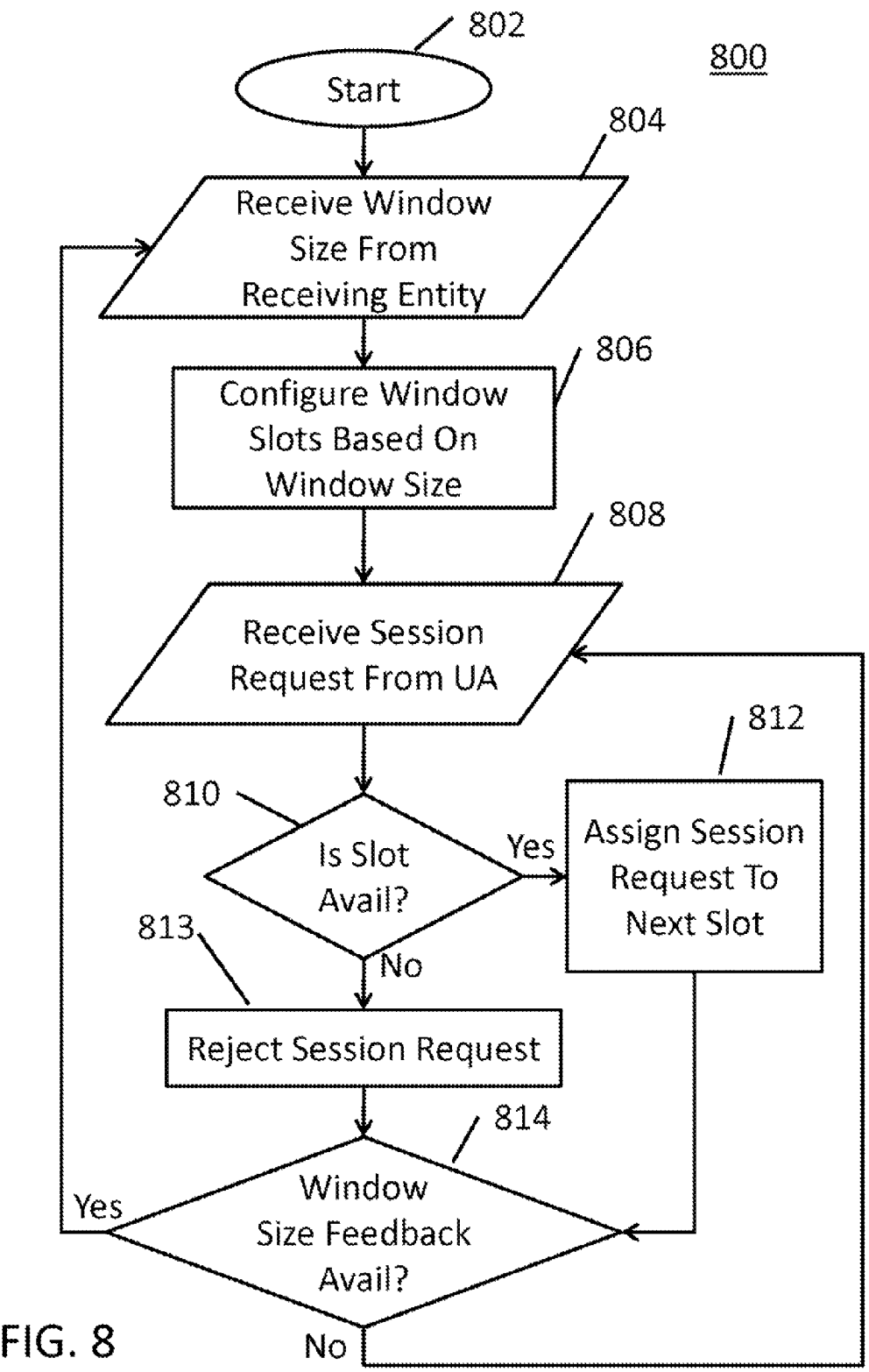
FIG. 8 is a diagram of a process for enforcing feedback in accordance with some embodiments.

Turning to FIG. 8, an example 800 of a process for enforcing feedback in accordance with some embodiments is shown. As illustrated, after process 800 begins at 802, the process can receive a window size from the receiving entity server at 804. Using this window size, a corresponding number of window slots for establishing sessions in the receiving entity server can be configured at 806. Next, at 808, session request messages (e.g., INVITE messages) can be received from one or more user agents. Process 800 can then determine at 810 if a slot is available for the requested session. If a slot is available, then the session can be assigned to the next slot at 812. If a slot is determined to not be available at 810, then the Session Request can be rejected at 813. After rejecting the Session Request at 813, or after assigning a session to a slot at 812, the process can determine if a window size feedback update is available at 814. If there is an update, the process can loop back to 804 to receive the update. Otherwise, the process can loop to 808 to receive and queue the next session request message.

In some embodiments, mechanisms can be provided to provide a measure of fairness as to how window size is allocated among multiple sending entity servers. Fairness at the sending-entity-server level can be realized by allocating the same amount of window size to each sending entity server. Fairness at the end-user level can be realized by allocating a proportional amount of window size to each sending entity server based on the proportion of end users corresponding to each sending entity server compared to the entire pool of end users.

Figure 9:
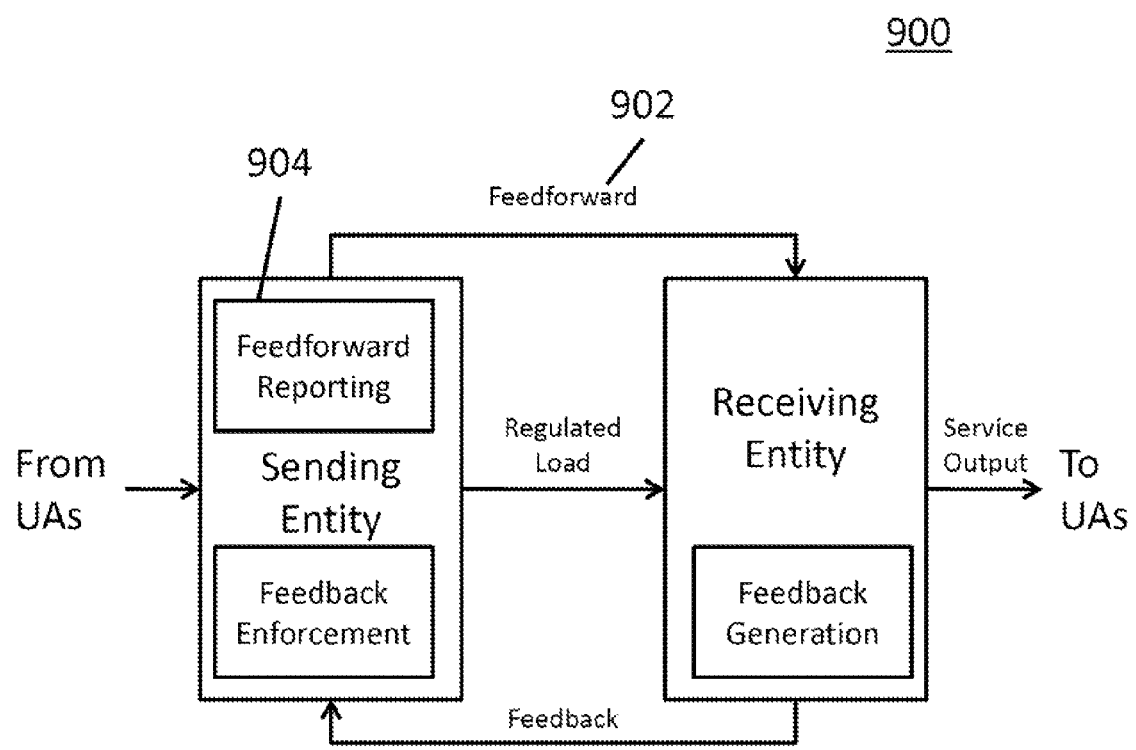
FIG. 9 is a diagram of a connection between a sending entity server and a receiving entity server incorporating feedback and feedforward in accordance with some embodiments.

To enable end-user fairness to be taken into consideration, in some embodiments feedforward information can be provided from the sending entity servers to the receiving entity server as illustrated by feedforward 902 in mechanism 900 of FIG. 9. This feedforward information can include the number of end-users (and/or any other suitable information) at each sending entity and can be generated by any suitable feedforward reporting unit 904. This feedforward can be used to achieve end-user fairness in the example processes of FIGS. 4 and 5a by allocating the total receiving entity server capacity among the sending entity servers according to the sending entity servers' incoming load. For example, the following equation calculated at 420 of FIG. 4:

$$w_i^{k+1} := \text{round}(w^{k+1}/N_{SE}^k)$$

can be changed to:

$$w_i^{k+1} := \text{round}(w^{k+1}(\text{feedforward}_i/\text{feedforward}_{total}))$$

wherein:
feedforward$_i$ is the number of end-users at sending entity i; and
feedforward$_{total}$ is the total number of end-users at all sending entity servers.

As another example, the following equation calculated at 520 of FIG. 5a:

$$w_{share}^t := w_{left}^t/N_{SE}^t$$

can be changed to:

$$w_i^{k+1} := \text{round}(w^{k+1}(\text{feedforward}_i/\text{feedforward}_{total}))$$

wherein:
feedforward$_i$ is the number of end-users at sending entity i; and
feedforward$_{total}$ is the total number of end-users at all sending entity servers.

Alternatively, for the process of FIG. 5a, the calculations performed at 520 can be changed to:

$$N_{sess}^{max} := \mu^t D_B$$

$$w_{left}^t := N_{sess}^{max} - N_{sess}$$

$$w_{left}^t := w_{left}^t + w_{left}^t$$

if $(w_{left}^t \geq 1)$ $$w_{left}^t := (\text{frac})w_{left}^t$$

$$w_{share}^t := (\text{int})w_{left}^t$$

$w_i^t := w_{share}^t$ with probability feedforward$_i$/feedforward$_{total}$ wherein:
$w_{left}^{t=0}$, is initialized at 504 of FIG. 5a to zero;
$\mu^t$ is the current estimated session service rate determined at 514;
$D_R$ reflects the allowed budget message queuing delay and can have a value of 200 ms or any other suitable value;
$N_{sess}$ is the number of sessions remaining to be serviced determined at 516
(int) is an operator which returns the integer part of the operand;
(frac) is an operator which returns the fractional part of the operand;
feedforward$_i$ is the number of end-users at sending entity i; and
feedforward$_{total}$ is the total number of end-users at all sending entity servers.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for providing feedback to a sending entity that sends requests for sessions, comprising:
a Session Initiation Protocol (SIP) server that receives the requests for sessions from the sending entity, wherein the SIP server comprises at least one hardware processor that:
determines a number of active sources associated with the sending entity;
receives an indication of the sending entity's incoming load;
determines a number of sessions that the sending entity is able to accept based on the number of active sources determined, a session service rate for the SIP server, a number of sessions to be serviced by the SIP server, and the sending entity's incoming load; and
provides the number of sessions that the sending entity is able to accept to the sending entity.

2. The system of claim 1, wherein the at least one hardware processor also:
determines the session service rate for the SIP server; and
determines the number of sessions to be serviced by the SIP server.

3. The system of claim 1, wherein the at least one hardware processor also:
tracks a number of new sessions received by the SIP server; and
updates the number of sessions reported to the sending entity based on the number of new sessions received.

4. The system of claim 1, wherein the at least one processor determines the number of sessions periodically.

5. The system of claim 1, wherein the at least one processor determines the number of sessions in response to an occurrence of an event.

6. A method for providing feedback to a sending entity that sends requests for sessions, comprising:
receiving by a hardware processor of a Session Initiation Protocol (SIP) server the requests for sessions from the sending entity;
determining a number of active sources associated with the sending entity;
receiving an indication of the sending entity's incoming load;
determining a number of sessions that the sending entity is able to accept based on the number of active sources determined, a session service rate for the SIP server, a number of sessions to be serviced by the SIP server, and the sending entity's incoming load; and
providing the number of sessions that the sending entity is able to accept to the sending entity.

7. The method of claim 6, further comprising:
determining the session service rate for the SIP server; and
determining the number of sessions to be serviced by the SIP server.

8. The method of claim 6, further comprising:
tracking a number of new sessions received by the SIP server; and
updating the number of sessions reported to the sending entity based on the number of new sessions received.

9. The method of claim 6, wherein the number of sessions is determined periodically.

10. The method of claim 6, wherein the number of sessions is determined in response to an occurrence of an event.

11. A non-transitory computer-readable medium containing computer-executable instructions that, when executed by a hardware processor of a Session Initiation Protocol (SIP) server, cause the processor to perform a method for providing feedback to a sending entity that sends requests for sessions, the method comprising:
receiving the requests for sessions from the sending entity;
determining a number of active sources associated with the sending entity;
receiving an indication of the sending entity's incoming load;
determining a number of sessions that the sending entity is able to accept based on the number of active sources determined, a session service rate for the SIP server, a number of sessions to be serviced by the SIP server, and the sending entity's incoming load; and
providing the number of sessions that the sending entity is able to accept to the sending entity.

12. The non-transitory computer-readable medium of claim 11, wherein the method further comprises:
determining the session service rate for the SIP server; and
determining the number of sessions to be serviced by the SIP server.

13. The non-transitory computer-readable medium of claim 11, wherein the method further comprises:
tracking a number of new sessions received by the SIP server; and
updating the number of sessions reported to the sending entity based on the number of new sessions received.

14. The non-transitory computer-readable medium of claim 11, wherein the number of sessions is determined periodically.

15. The non-transitory computer-readable medium of claim 11, wherein the number of sessions is determined in response to an occurrence of an event.

* * * * *